United States Patent [19]

Mitchell et al.

[11] Patent Number: 5,115,710

[45] Date of Patent: May 26, 1992

[54] LOAD-REDUCING ROCKET NOZZLE OPERATION METHOD

[75] Inventors: David L. Mitchell, Los Altos; Alan J. Stein; Charles L. Barndt, Jr., both of Sunnyvale; William W. Szeto, San Jose, all of Calif.

[73] Assignee: The United States of America as represented by the Secretary of the Navy, Washington, D.C.

[21] Appl. No.: 674,275

[22] Filed: Feb. 19, 1991

[51] Int. Cl.⁵ .................................... F41F 3/07
[52] U.S. Cl. .......................... 89/1.809; 89/1.1
[58] Field of Search ............ 89/1.809, 1.810, 1.813, 89/1.1, 1.11

[56] References Cited

U.S. PATENT DOCUMENTS

| | | | |
|---|---|---|---|
| 3,166,977 | 1/1965 | Pickett et al. | 89/1.809 |
| 3,166,979 | 1/1965 | Draim | 89/1.809 |
| 4,671,163 | 6/1987 | Erikson | 89/1.810 |
| 4,949,618 | 8/1990 | Tarlano | 89/1.809 |

*Primary Examiner*—David H. Brown
*Attorney, Agent, or Firm*—Kenneth L. Warsh; Robert M. Wohlfarth; Wayne O. Hadland

[57] ABSTRACT

A submarine launched missile generates undesirable stress on the rocket nozzle hydraulic control system at the moment of ignition of the rocket motor. This stress can be minimized by operating the system so that the nozzle is near center and the hydraulic actuator valves are open at ignition.

3 Claims, 2 Drawing Sheets

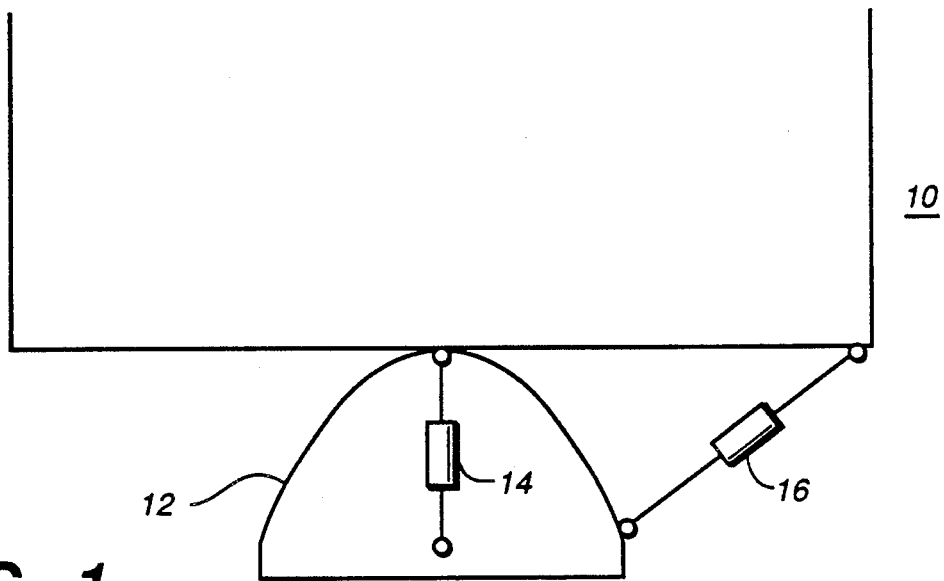
FIG._1
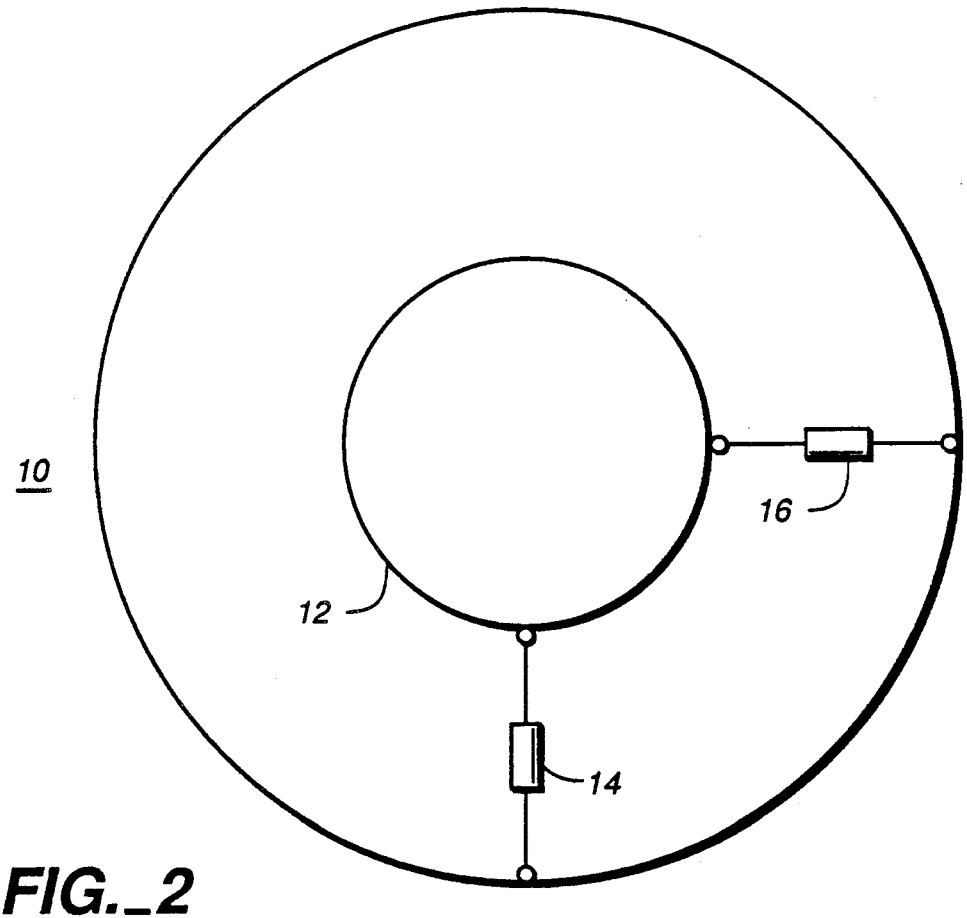
FIG._2

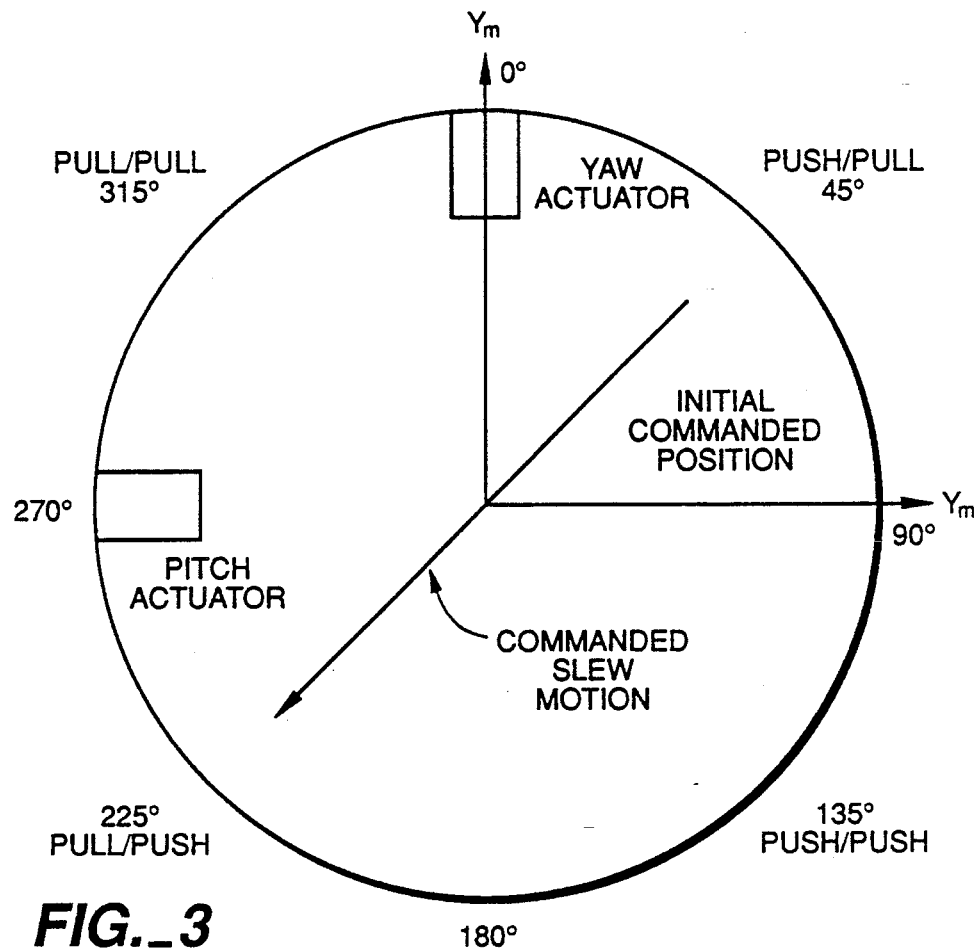
FIG._3
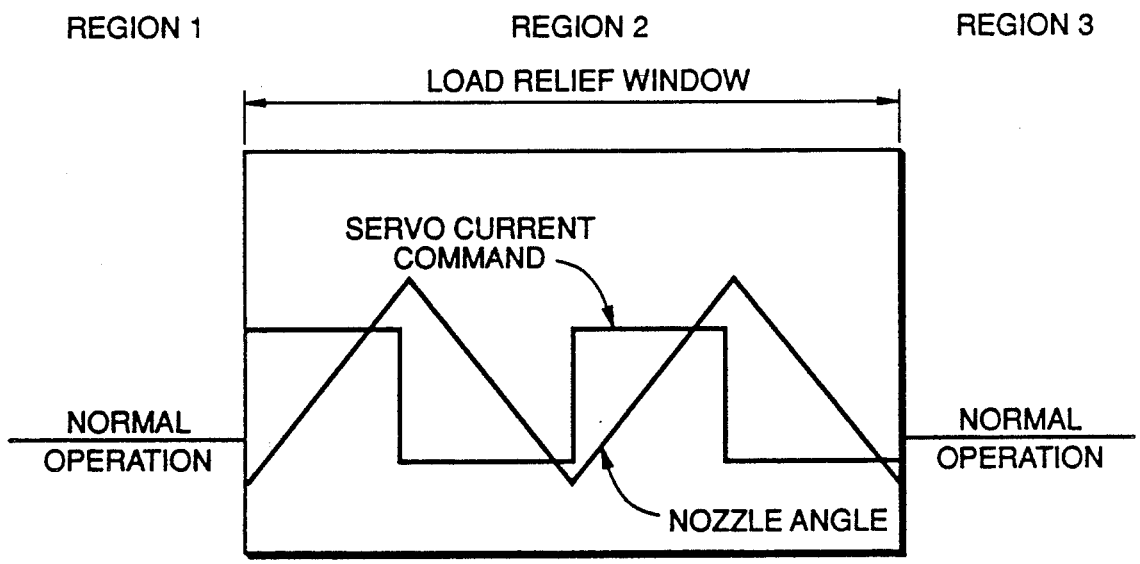
FIG._4

LOAD-REDUCING ROCKET NOZZLE OPERATION METHOD

FIELD OF THE INVENTION

This invention pertains to a method and apparatus for minimizing stress on the nozzle of a rocket launched from beneath the water.

BACKGROUND OF THE INVENTION

Rockets launched from beneath the water generally do not ignite the rocket motor until the rocket has cleared the water surface. During time between launch and ignition the nozzle of the rocket motor can be positioned by a hydraulic actuator system so that rocket orientation can be corrected on ignition.

Ignition of the rocket motor after underwater launch has been shown to produce undesirable stress forces on the rocket motor exit nozzle. These stress forces on the exit nozzle are transferred to the hydraulic actuator system, potentially causing structural failure.

OBJECTIVES OF THE INVENTION

It is therefore a primary objective of the present invention to derive a method of operating the rocket nozzle actuators to minimize the stresses transferred from the rocket motor nozzle at the moment of ignition.

SUMMARY OF THE INVENTION

These objects of the invention and other objects, features and advantages to become apparent as the specification progresses are accomplished by the invention according to which, briefly stated, the actuators are operated to center the nozzle and then initially move the nozzle from center. The actuators are then commanded to return the nozzle forward center and remain open so that the nozzle is near center and the actuator hydraulic valves are open at the moment of ignition.

LIST OF ADVANTAGES OF THE INVENTION

An important advantage of the present invention is that the nozzle is near center at the moment of ignition thereby minimizing the sideways forces on the nozzle and actuator system.

A further advantage is that the hydraulic valves are open and operating at the moment of ignition thereby maximizing the ability of the actuator system to absorb stress.

These and further objectives, constructional and operational characteristics, and advantages of the invention will no doubt be more evident to those skilled in the art from the detailed description given hereinafter with reference to the figures of the accompanying drawings which illustrate a preferred embodiment by way of non-limiting example.

BRIEF DESCRIPTION OF THE DRAWINGS

FIG. 1 is a side view of the aft end of the rocket system used in the inventive method of operation.

FIG. 2 is an aft end view of the rocket of FIG. 1.

FIG. 3 is a diagram of the motion of the method according to the invention, from initial commanded position to opposite position.

FIG. 4 is a timing diagram showing the relationship between the desired load relief window and command current to the actuators.

GLOSSARY

The following is a glossary of elements and structural members as referenced and employed in the present invention.

10—aft end of rocket fuel tank
12—rocket nozzle
14, 16—nozzle hydraulic actuators

DESCRIPTION OF THE PREFERRED EMBODIMENTS

External loads are induced on the first stage nozzle of a missile during underwater launch. These loads are transferred to the nozzle actuators, which can cause structural failure. Actuator loads are greatly reduced if the servo control valves are commanded open when these loads are present flight computer code was designed to enable the actuator servo control valves to be commanded open during first stage ignition loads.

Referring now to the drawings wherein like reference numerals are used to designate like or corresponding parts throughout the various figures thereof, there is shown in FIGS. 1 and 2 a side view and an end view, respectively, of the aft end o the missile. At 10 there is shown the aft part of the fuel tank. The rocket nozzle 12 is attached to the fuel tank 10 through a flexible joint, the details of which are not shown here. Two hydraulic actuators 14 and 16 are positioned to move the nozzle in planes at right angles to each other.

The hydraulic system experiences great stress if the nozzle is positioned at a large angle to one side at ignition. The ability to absorb this stress is reduced if the hydraulic valves are closed.

Therefore, in the method of the invention, after underwater launch the nozzle is positioned close to center, within above 3.5°, as shown in FIG. 3. Approximately 20 milliseconds before ignition the actuator valves are commanded to move the nozzle toward center and remain open for at least 40 milliseconds thereby slewing the nozzle from about +3.5° to −3.5°. During the time of peak stresses at ignition and for a few milliseconds afterward, the nozzle is near center, thereby minimizing sideways forces. The actuator valves are open so as to retain the maximum shock absorbing ability of the system. This combination minimizes destructive forces which could cause system failure.

It is to be understood that the angular position and timing given above is are for a single case having certain angular slew rates of the nozzle actuator and a certain period during which maximum stress is to be avoided. In any other case, the angular position and timing can be adjusted to achieve the desired result.

An elaboration on the invention to increase its usefulness is shown in FIG. 4. The time the servo control valves are to be commanded open is the load relief window, region 2. Outside of this window, normal operation is used. During the load relief window, the servo valves are commanded open by flight controls by a square ave current command, which results in a constant nozzle slew rate which reverses and repeats in a cyclic manner. The square wave current profile enables the reversal of nozzle motion which may be necessary to present excessive nozzle movement.

In a further elaboration, the first small angle from center at which the nozzle is positioned may not be exactly the same as the maximum angles described above. The first small angle is chosen so that by best estimate of nozzle slew rate and ignition timing sequence, the nozzle is exactly on center at moment of maximum stress.

This invention is not limited to the preferred embodiment heretofore described, to which variations and improvements may be made, without departing from the scope of protection of the present patent and true spirit of the invention, the characteristics of which are summarized in the following claims.

We claim:

1. A method of operating a submarine launched rocket so as to minimize s tress forces on the nozzle actuator system, comprising the steps of:
    a) launching said rocket,
    b) positioning said nozzle close to center at a first small angle at a first side of center, and
    c) opening the actuator valves to move the nozzle, and shortly thereafter
    d) causing motor ignition so that ignition occurs while said valves are open and said nozzle is near center.

2. The method according to claim 1 wherein the initial motion of the nozzle is continued until the nozzle reaches a second small angle on the opposite side of center, and subsequently reverses direction to return to said second small angle on the first side of center.

3. The method according to claim 2 wherein said steps are repeated a number of times in a cyclic manner until the desired period for load relief is achieved.

* * * * *